April 23, 1946.  R. B. FOSTER  2,399,014
GROUND SPEED METER FOR AIRCRAFT
Filed Feb. 5, 1943   2 Sheets-Sheet 1

INVENTOR.
ROBERT B. FOSTER
BY
*William E Hall*
ATTORNEY.

April 23, 1946.　　　R. B. FOSTER　　　2,399,014
GROUND SPEED METER FOR AIRCRAFT
Filed Feb. 5, 1943　　　2 Sheets-Sheet 2

INVENTOR.
ROBERT B. FOSTER
BY
William E. Hall.
ATTORNEY.

Patented Apr. 23, 1946

2,399,014

UNITED STATES PATENT OFFICE 2,399,014

GROUND SPEED METER FOR AIRCRAFT

Robert B. Foster, Los Angeles, Calif., assignor to Richard H. H. Foster, Los Angeles, and Robert E. Foster, Glendale, Calif.

Application February 5, 1943, Serial No. 474,861

1 Claim. (Cl. 33—46.5)

My invention relates to an instrument for aircraft for measuring or determining the speed of the aircraft with respect to the ground.

An important object of this invention is to provide an instrument or means of this class which is relatively easy to operate for measuring or determining directly the forward speed of the aircraft, on which it is installed, with respect to the ground.

An object of this invention is the determination also, by simple means or calculations, the drift of the aircraft with respect to the ground.

An important feature of this invention is the fixing of the visual ground speed of the aircraft of the terrain over which the aircraft is moving with respect to a predetermined fixed elevation above the terrain, the speed of the aircraft being determined by measuring directly the speed of a false terrain which is synchronized with the movement over the real terrain at said determined fixed elevation.

Another object of this invention is to provide a novelly constructed false terrain, and novel means of synchronizing the same with the reduced real terrain.

Still another important object of this invention is to provide suitable and readily observable markings on the moving false terrain for the purpose of readily synchronizing its movement with the movement of the real terrain.

A further object of this invention is to provide novel means of superimposing an image of the moving false terrain over an image of the real terrain to facilitate the synchronization of the former with the latter.

A still further object of this invention is to provide a novel means of mounting an instrument of this class on an aircraft for shifting the same into the direction of the actual movement of the aircraft over or with respect to the ground to facilitate proper direction of the aircraft towards its destination or object, and also for determining the angle between the longitudinal axis of the aircraft and the direction of ground movement for calculating the forward speed of the aircraft as well as the drift.

With these and other objects in view, as will appear hereinafter, I have devised an aircraft ground speed meter, having certain novel features of construction, combination, and arrangement of parts and portions, as will be hereinafter described in detail and particularly set forth in the appended claim, reference being had to the accompanying drawings and to the characters of reference thereon, which form a part of this application, in which:

Figure 1:
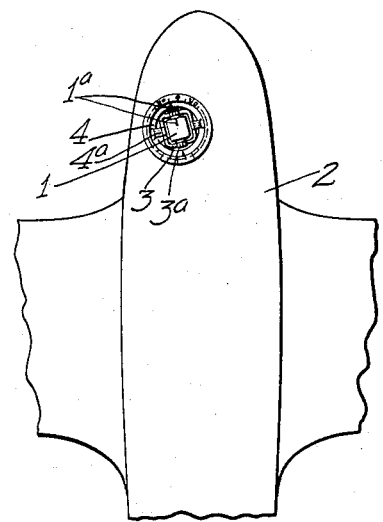
Fig. 1 is a fragmentary view of an airplane showing my ground speed meter in one form mounted on the fuselage thereof.

The principal portion of my aircraft ground speed meter is contained in a housing 1 which is so mounted on the carrying aircraft 2, shown in the drawings as an airplane, that the ground-viewing portion is at all times directed downwardly, or maintained vertically, substantially in line with the earth's axis, and is also so mounted that the ground-viewing portion may be maintained in line with actual movement of the aircraft over the ground.

As shown in the drawings, the housing 1 is pivotally mounted at its opposite sides on a horizontal axis, as indicated by 3ª, on an intermediate carrier ring 3, and this ring is also pivotally mounted on a horizontal axis, but at right angles to the first-named pivotal mounting, on a main carrier ring 4, the latter mounting being designated 4ª. Both pivotal axes pass through the housing 1 preferably slightly above the center of gravity of the housing so that the mechanism within the housing will automaticlly maintain its intended upright position with the ground-viewing portion directed at all times downwardly in a vertical direction.

The main carrier ring is mounted to rotate on a substantially vertical axis, with respect to the aircraft, on a circular bed 5, for rotating the ground speed meter so that the image of the ground, or real terrain viewed therethrough, may move in alignment with the image of the movement of a false terrain within the instrument housing, which false terrain will be more particularly described hereinafter. The supporting bed 5 is provided with appropriate degree graduations, along or over which a master index mark or finger 1ª may move, for determining accurately the angle between the longitudinal axis of the aircraft with respect to the direction of movement of the aircraft over the ground.

It is apparent from the above (and it requires no further illustration) that the housing 1 of the meter may be rotatably mounted directly on a vertical aixs on a carrier ring and that the latter may be mounted on horizontal axes, one located at right angles to the other, on the supporting bed. The deflection of the meter with respect to the aircraft is determined directly between the housing and its supporting carrier ring. Such mounting avoids the possible error in determining such deflection when the aircraft is banking or nosing up or down to a large degree. It is disadvantageous, however, in that the graduations of the scale for determining the deflection must necessarily be considerably smaller, and therefore the deflection may not be determined as accurately.

Within the housing 1 is provided a moving false terrain A which is superimposed over and synchronized with the image of the real terrain, and the actual speed of the movement of the aircraft over the real terrain is determined by measuring the movement of the false terrain.

At the lower end of the housing 1 is provided an adjustable telescope 11 having a movable objective 11ª and a means 12 for adjusting the objective with respect to the eye piece which is here shown as a ground glass plate 13. The image on the plate 13 is reflected through mirrors 14 and 15 toward the viewing opening 1ᵇ in the housing.

The false terrain is provided or carried on a carrier which consists of a long narrow flexible tape 21, approximately one-half inch in width. The portion, designated 21ª of this tape is directed to move in front of the mirror 14 and thereby the image of this portion of the tape is superimposed over the image of the real terrain viewed through the telescope or projected on the plate 13. As shown, the ends of the portion 21ª of the false terrain tape pass over rollers 22 and 23. From the rollers 23 the tape passes around a large drum 24, then around a drum 25 mounted on the shaft of a motor 26. Other rollers 27 and 28 are provided for directing the tape over the drums 24 and 25.

The tape 21 is provided preferably with irregular figures or designs 21ᵇ which are varicolored so that movement of the image of the false terrain over the image of the real terrain may be readily observed. The portion 21ª of the false terrain facing the mirror 15 is suitably illuminated by a lamp or other means 29 so as to further make the movement of the image of the false terrain more readily discernible over the image of the real terrain.

The speed of the motor 26 is determined by a suitable speedometer 31, and, by conversion of rotary to linear units, the linear speed of the false terrain may be readily determined. This speed of the tape is the speed of the aircraft over the real terrain, when the false terrain is synchronized and calibrated with respect to the image of the real terrain, that is, when the image of the real terrain is considered as being a fixed elevation above the latter. If the speed of the aircraft above the real terrain, at an elevation of one thousand feet is taken as a standard, then the synchronized movement of the image of the false terrain is considered the standard for calibrating the speedometer with the speed of the aircraft at the one thousand-foot elevation.

In order to synchronize the image of the false terrain with that of the real terrain, a rheostat 32, or other suitable apparatus, is provided. This rheostat may be manually operated, but it is obvious that by apparatus now known and used that the image of the false terrain may be automatically synchronized with the image of the real terrain.

A telescope 11 is here shown as employed for viewing the ground. It is not, however, necessary to focus the telescope with the ground, but it is necessary so to project the image of the telescope on the eye piece or on the ground glass that the movement over the reel terrain is reduced to the standard of a one thousand foot elevation. The telescope may be so calibrated, by the known focal length of the lenses therein, that the position of the movable objective 11ª will project an image on the plate 13 corresponding to a one thousand-foot elevation. To facilitate the adjusting of the telescope, there is provided on the objective calibrations designating the elevations, and the objective may be adjusted after determination of the elevation of the aircraft from a suitable altimeter, constructed on the principle of an aneroid barometer, which may show the elevation above sea level. However, a suitable electric beam reflecting altimeter may be used to indicate the elevation above the terrain over which the aircraft is flying. The adjustment of the telescope, as described, may be made automatically from the positions of the indicating needles or other members of the altimeter employed, such showing of automatic means for this purpose being however thought unnecessary.

The index finger or mark 1ª on the carrier ring 4, or on the housing of my instrument, is set, by compass (not shown) carried by the aircraft, in the direction of the intended course, and the craft is then turned in such direction that the image of the real terrain moves in the same direction as the image of the false terrain. As the object or desired target is approached, the housing 1 of the instrument or meter is rotated until the index mark thereof is in the line of or direction of the object or target. The craft is then turned until the image of the real terrain moves in the same direction as the image of the false terrain. The index mark of the meter and the direction of the craft are constantly adjusted as stated for maintaining the direction of the instrument and the false terrain in line with said object.

Figure 3:
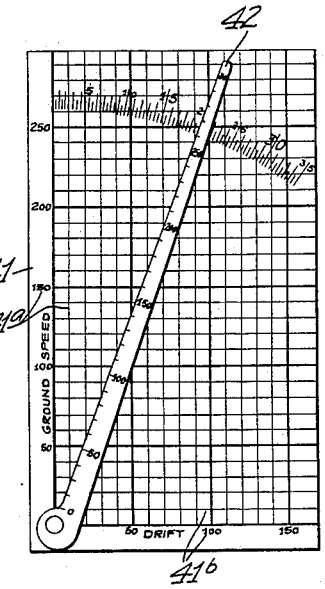
Fig. 3 is a diagrammatic view of an apparatus for determining the drift of the aircraft and also the wind speed.
Figure 2:
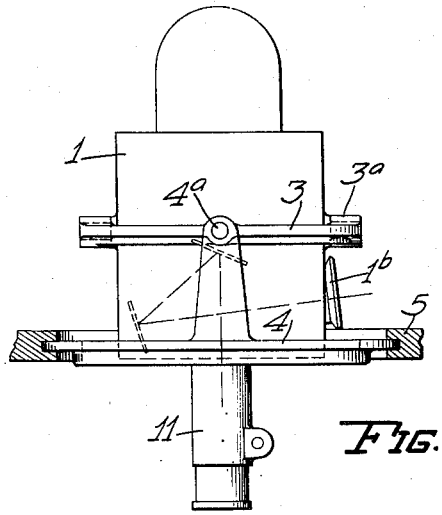
Fig. 2 is an enlarged side elevation of my ground speed measuring instrument or meter, showing one form of mounting thereof for maintaining a vertical position and also for rotating the same laterally in different directions.
Figure 4:
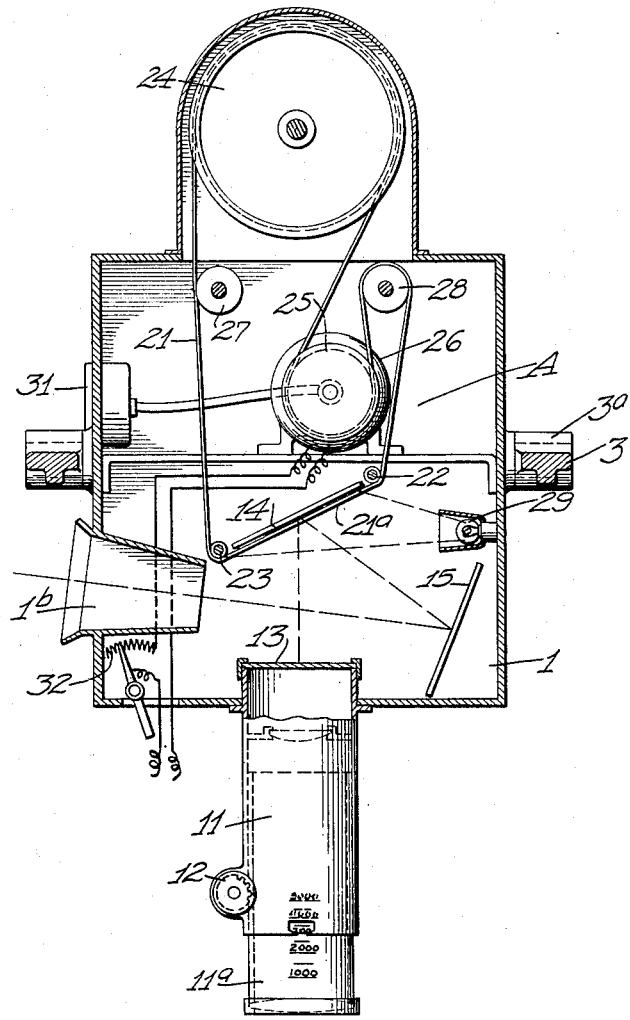
Fig. 4 is an enlarged sectional elevational view of the principal operating mechanism of my ground speed measuring instrument; and, Fig. 5 is a fragmentary view of the tape used for representing the false terrain.
Figure 5:
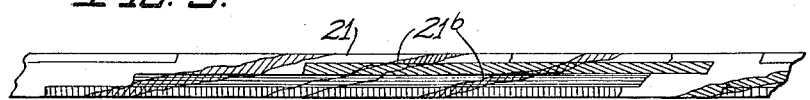

In Fig. 3 of the drawings is shown an apparatus for determining the drift and the wind speed of the aircraft. This apparatus is provided with a graph 41 having a series of horizontal and vertical lines, the spaces between or graduations of the horizontal lines being indicated 41ª on the major axis and those between or the graduations of the vertical lines being indicated 41ᵇ on the minor axis, and designate, respectively, forward speeds and apparent drift of the aircraft over the terrain traveled, the graduations between the lines being of any linear units desired. At the intersection of the major and minor axes is pivoted an index member or straight edge 42, which straight edge may be rotated over the graph. The edge of this index member which passes through the pivotal axis is also provided with graduations corresponding with those along the major and minor axes. On the graph are provided other graduations 43 which are arcuately arranged around the intersection of the major and minor axes and correspond with compass readings. The index member 42 is alined with the graduation 43 corresponding with the angle between that indicated on the bed support 5 and which indicates the angle between the longitudinal axis of the aircraft and the actual direction of the movement of aircraft over the terrain.

Having determined the actual ground speed of the aircraft over the terrain, this determination is layed off by the graduations 41ª along the major axis and a transverse or horizontal line followed to the index member 42. The intersection of such line with the graduated edge of the index member determines the drift of the aircraft which may be read on the graduations 41ᵇ. From the Pitot tube, or other appropriate instrument on the aircraft, the air speed of the latter may be determined, and the difference between this speed and the graduation on the index member 42, at the intersection of the graduated edge thereof and the line designating the forward speed of the aircraft, indicates the wind speed over the terrain traveled.

Though I have shown and described a particular construction, combination, and arrangement of parts and portions, I do not wish to be limited to the same, but desire to include in the scope of my invention the construction, combination, and arrangement substantially as set forth in the appended claim.

I claim:

In a ground speed meter, the combination with an aircraft, means on the aircraft for receiving an image of the real terrain over which the aircraft is adapted to travel, means for adjusting the size of the image in proportion to the elevation of the aircraft above the real terrain for receiving the same size image irrespective of the elevation of the aircraft, a carrier provided with a false terrain, means for moving the carrier in the direction of movement of the image of the real terrain, means for adjusting the speed of the carrier moving means for synchronizing the false terrain of the carrier with the speed of the image of the real terrain, and means fixedly and operatively connected to the latter means for measuring the linear speed of the false terrain.

ROBERT B. FOSTER.